United States Patent Office 3,325,788
Patented June 13, 1967

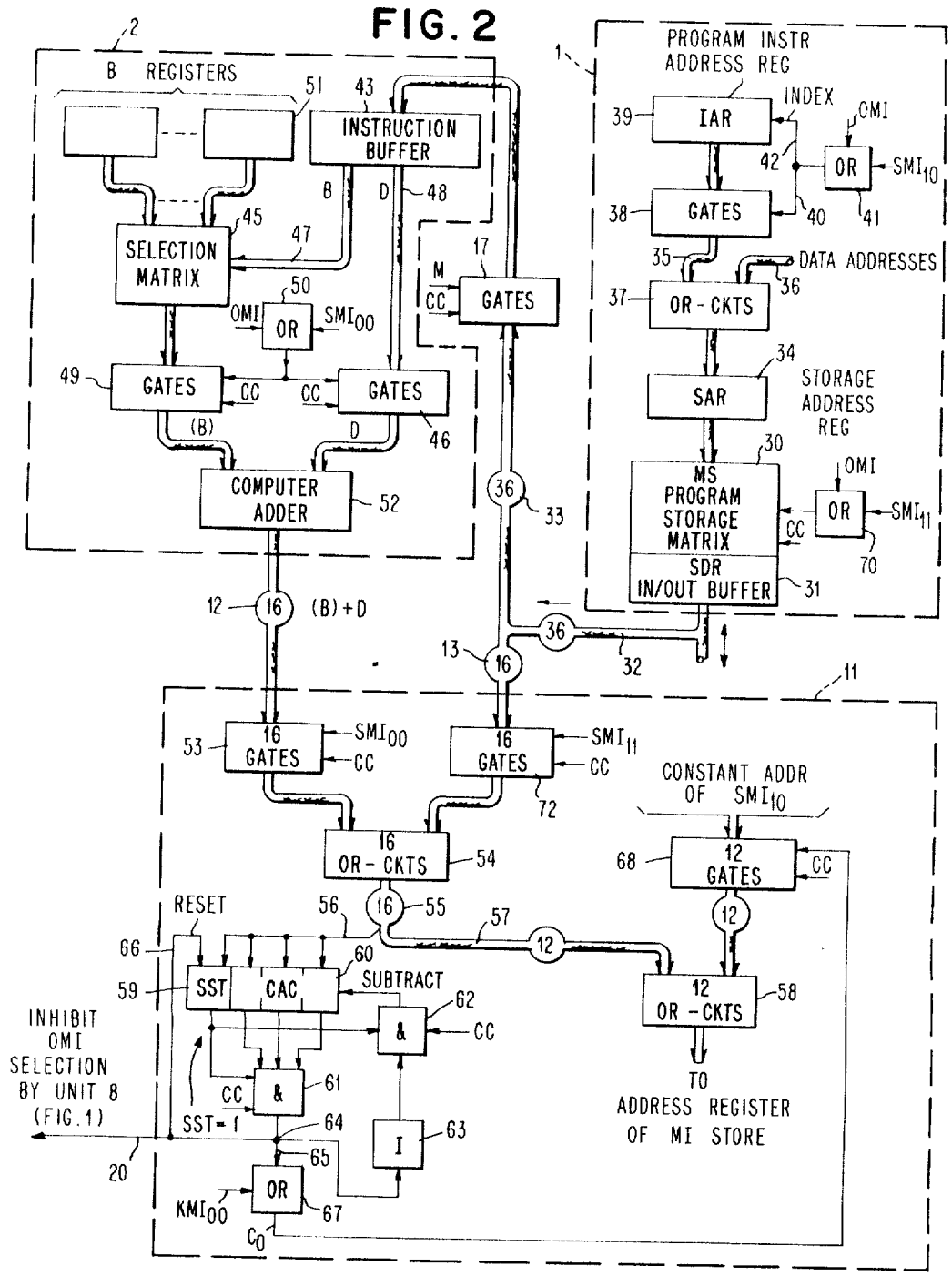

3,325,788
EXTRINSICALLY VARIABLE MICROPROGRAM CONTROLS
Frank J. Hackl, Clinton Corners, N.Y., assignor to International Business Machines Corporation, New York, N.Y., a corporation of New York
Filed Dec. 21, 1964, Ser. No. 419,677
15 Claims. (Cl. 340—172.5)

This invention pertains to microprogram sequence controls for data processing systems, and particularly to intrinsic controls which can be varied in an arbitrary manner by extrinsic program information signals to produce different basic micro-operation control effects under direct program control.

As used herein the term "extrinsic" refers to program information which originates outside of the data processing system in the form of signals specified by programming personnel, and to those operations of the system which are directly affected by such information. All other operations are characterized as "intrinsic," or "intrinsically controlled."

Intrinsic microprogram controls are usually organized into two distinct complexes, or matrices. One of these contains translating elements for selectively producing a multiplicity of control signals, also known as microinstruction signals, which control the circulation of information throughout the controlled system on a cyclic basis, and the other complex is designed to produce address signals for controlling the sequence of microinstructions produced by the first complex.

It has been suggested in the past that the size, utility, and versatility of such controls could be improved by including extrinsically erasable storage elements in one or the other of the basic complexes. This would permit intrinsic microprogram modifications to be carried out automatically under extrinsic program control, whereby the controls in an existing facility could be modified to suit the requirements of different processing applications. On the other hand, however, erasable storage elements are more susceptible to fortuitous alteration in state, and are more difficult to interrogate in a non-destructive sense, than equivalent permanent storage elements.

At the present state of component and circuit development it appears that permanent control organizations are considered more practical, as evidenced by the present trend toward the design of families of computers having different speed and storage capabilities, but using a common predetermined extrinsic program order code structure, and therefore having permanently established intrinsic microprogram controls. In such families all computers are capable of executing the same extrinsic program instructions, subject to respective speed and storage capacity restrictions.

While such families of computers can handle practically all data processing and control applications, they still require extrinsic control adaptability for certain specialized functions; particularly in the implementation of programs for automatic self-evaluation, or fault diagnosis, and maintenance. This invention is therefore concerned with the provision of an extrinsic control adaptability feature in systems having intrinsic controls organized on a permanent basis.

An object of this invention is to provide a system of permanently established intrinsic microprogram controls which are yet subject to extrinsic variation on a temporary and conditional basis.

Another object is to provide intrinsic microprogram controls which can be temporarily varied by extrinsic program information contained in a general purpose erasable store.

Another object is to provide intrinsic microprogram controls which can be varied on a temporary basis by extrinsic program information to produce microinstruction control signals in a form and/or a sequence not generally accessible.

Another object is to provide intrinsic microprogram controls which are adapted to react to a particular extrinsic program command to produce a variable sequence of microinstruction control signal states corresponding directly to variable extrinsic program information accompanying said particular command.

Yet another object is to provide intrinsic microprogram controls ordinarily adapted to selectively produce microinstruction control signals under the control of intrinsic signals and adaptable conditionally to produce a variable series of microinstruction control signals under extrinsic program control, with some of the individual microinstructions in the series selected exclusively in accordance with extrinsic program information and other microinstructions in the series selected in the ordinary intrinsic sequence, the determination of the manner of selection of each microinstruction in the series being determined by the extrinsic program information.

Still another object is to provide a microprogram control system having a permanently established repertoire of intrinsic microprogram sequences associated therewith, which can be conditioned by extrinsically originated signals to produce microprogram sequences other than said intrinsic sequences, said other sequences including but not limited to variable truncated segments of said intrinsic sequences.

Yet another object is to provide a system of permanently established microprogram controls, for controlling the basic functions of a data processing system, and having an improved capability for controlling diagnostic testing and evaluating procedures within said system.

These and other objects of the invention are realized in an exemplary embodiment thereof which is described in varying breadth of detail below. This embodiment comprises a matrix of 2,816 permanently stored control microinstructions each containing 90 micro-operation control bits, and first and second permanently organized sequence selecting units. In ordinary intrinsic operation the first unit cooperates with the matrix outputs to control the sequence of selection of microinstructions from said matrix in intrinsically determined microprograms series, each series having a limited range of conditional, or extrinsically determined, variation in the selections made therein. For example, the successor to any current microinstruction may be selected from a set of from 1 to 16 microinstructions, depending upon the instantaneous values of selected signals representative of either variable extrinsic program instruction order code information or current conditions locally within the system.

In response to the order code in a special program instruction entitled, "DIAGNOSE," which as its name implies is used for diagnostic testing and evaluation purposes, the normally idle second sequence selecting unit is operated for one or more control cycles, during which the first unit is coincidentally disabled. The second unit is adapted to retrieve variable extrinsic program data from a source determined by the DIAGNOSE instruction, and to apply a part of the data to address controls of the microinstruction storage matrix, whereby an arbitrary one of the 2,816 microinstructions is selected. One operation of the second unit could be followed directly by another or the first unit may be permitted to resume operation on either an unconditional or a conditional basis. If control by the first unit is unconditional, the second unit reverts to its normal idle condition and remains idle until another DIAGNOSE instruction occurs in the extrinsic program. However, if the first unit has resumed operation on a conditional basis it will operate through a variably truncated intrinsic microprogram sequence as specified by another part of the variable program data, and then the second unit will again assume control to retrieve and handle another variable word of extrinsic data whereby again any one of the 2,816 microinstructions is selected. This process continues until the first unit acquires unconditional control of the sequencing. The second sequence selecting unit can thus operate to chain together extrinsic program data words in arbitrarily variable sequences, and thereby produce variably truncated segments of ordinarily indivisible intrinsic microprogram sequences, alternately selecting a first microinstruction of a segment on a variable basis, and then passing conditional control to the first unit for a variable number of micro-cycles, in accordance with the extrinsic program information accompanying a DIAGNOSE instruction. Since the selections are extrinsically determined, certain of the microinstruction addresses may be made inaccessible during ordinary intrinsic sequencing, so that associated drastic changes in computing or information handling states can occur only under exceptional conditions imposed on the use of the DIAGNOSE instruction.

The second sequence selecting unit comprises a switch circuit, a counting circuit, and a number of gates for transferring the extrinsically originated DIAGNOSE program data. When a DIAGNOSE order code is detected during ordinary intrinsic microinstruction sequencing, and in certain "chained" operations of the second unit, the said switch circuit, counting circuit, and gates are conditioned to receive different segments of a variable word of extrinsic program data. The data segment received by the gates is passed on to the microinstruction access controls to select a corresponding microinstruction which may be any one of the 2,816 stored microinstructions. The segment received by the switch is a single bit which determines whether the first sequence selecting unit shall operate on a conditional or unconditional basis. The data segment received by the counting circuit determines the number of micro-cycles of operation of the first unit, when it is operating on a conditional basis, to be interposed between the current and next operation of the second unit. In each such "chained" next operation the second unit initiates retrieval of another variable word of extrinsic program data from an erasable program data store and applies it to the aforementioned gates, switch and counting circuit, thereby initiating another variable sequence of conditional or unconditional control by the first unit.

Among the 2,816 microinstructions are a number of microinstructions which are used to construct special microprogram sequences known as kernels. Some of the kernels are accessible only through the use of extrinsic address data accompanying a DIAGNOSE instruction, and are thereby protected against inadvertent handling. Thus, kernels of this type can be used to modify information in normally protected or inaccessible parts of program storage, and to accomplish other radical changes in the information content and state of the computing system, with the DIAGNOSE instruction serving as a protective key.

These and other objects and features of the invention may be more fully understood and appreciated by considering the following detailed description thereof taken with reference to the accompanying drawings.

In the drawings:

FIG. 2 is a schematic drawing illustrating only those parts of the system of FIG. 1 which participate in the special extrinsically determined microinstruction selecting operations characteristic of the invention.

FIG. 3 is a diagrammatic illustration of the format of the DIAGNOSE program instruction which acts as a key to initiate operation of the circuits of FIG. 2;

Figure 1:
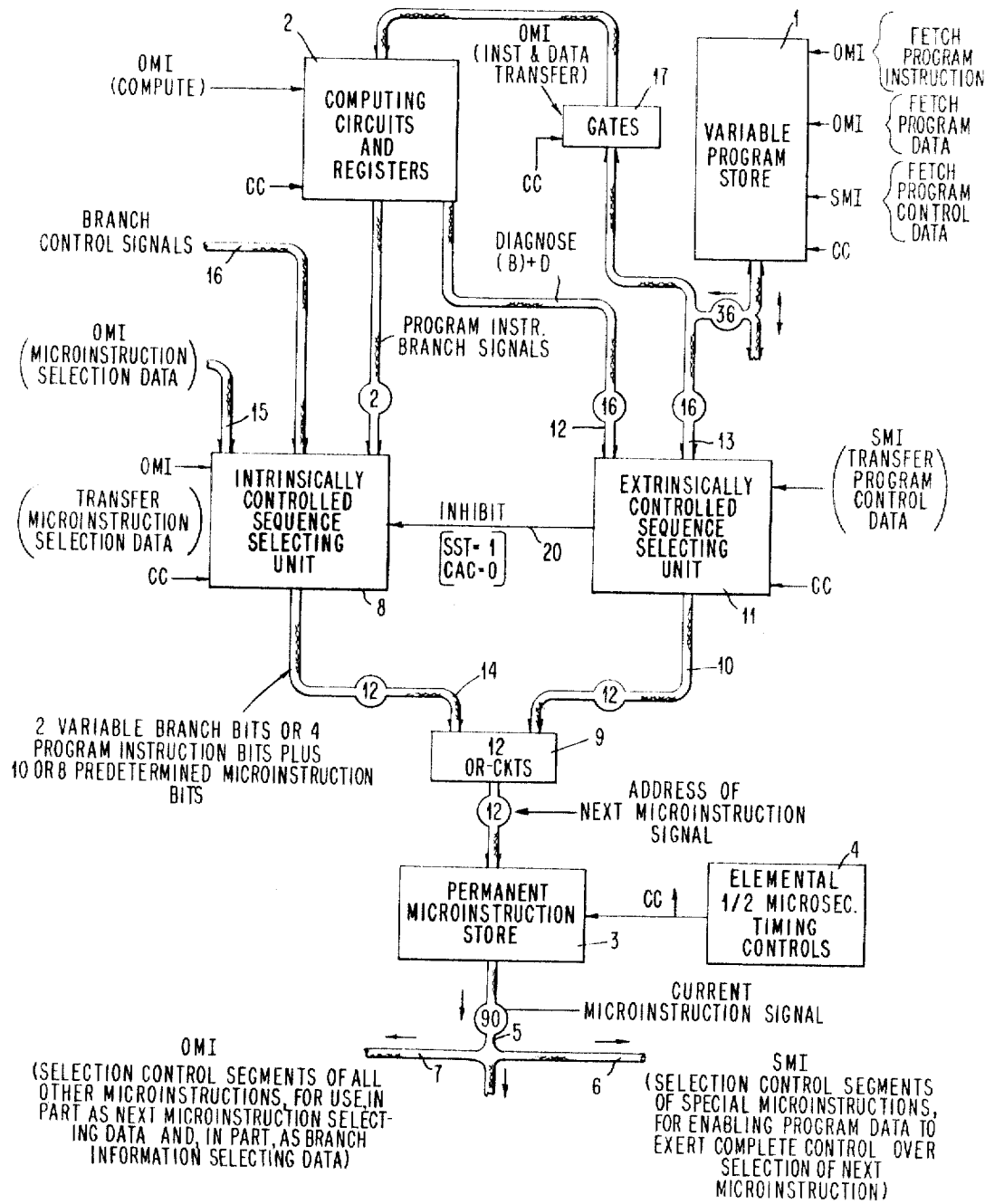
FIG. 1 is a schematic block diagram of a digital computer system embodying the extrinsic and intrinsic control features of the subject invention.
Figure 5:
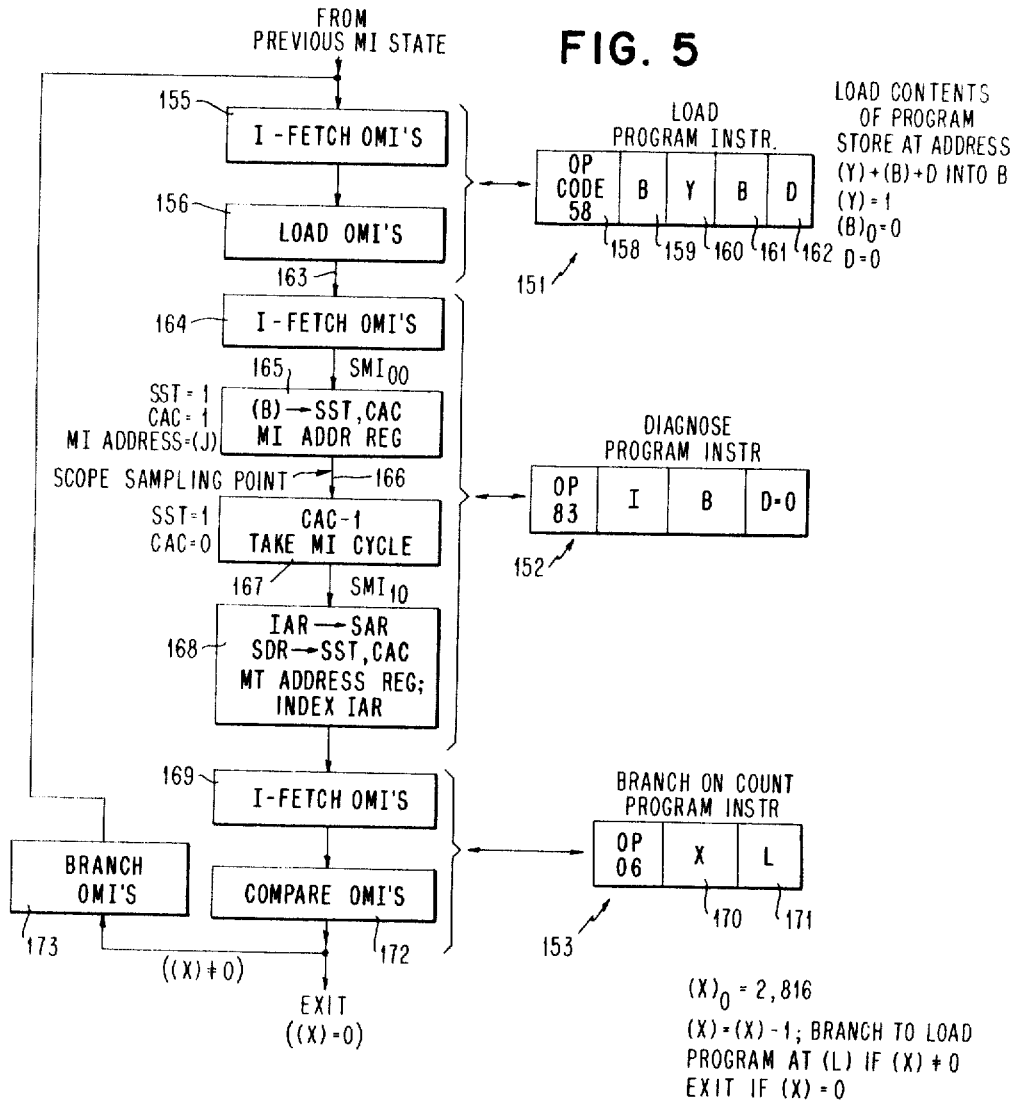
Figure 6:
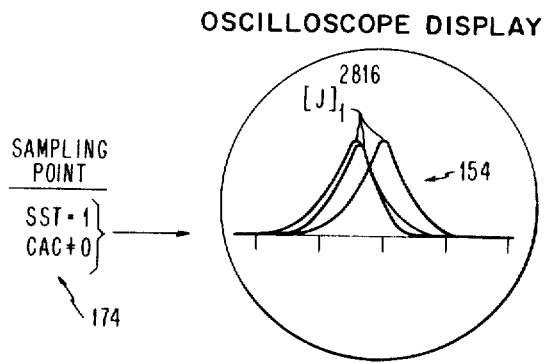

FIG. 5 is a diagrammatic operation flow chart of an exemplary extrinsic program incorporating a DIAGNOSE instruction, which can be executed by the system shown in FIG. 1 and can be used in auto-diagnostic tests of the intrinsic controls to sequence the controls through all of the microinstructions thereof in an extrinsically determined sequence; and FIG. 6 is a diagrammatic illustration of a coordinated oscilloscope display of the signals produced on one column output line (i.e. one control bit position) of the microinstruction storage matrix of FIG. 1 by the program of FIG. 5, said display representing a comparative view of all of the signals which could be placed on that line by sequential excitation of all matrix row lines.

GENERAL DESCRIPTION

FIG. 1 illustrates a data processing system including microprogram controls in accordance with the subject invention. As indicated therein the system comprises an erasable program store 1, and computing circuits and registers 2. All transfers of signals throughout the system are controlled by a permanently organized control system. The latter includes a permanent microinstruction store 3, which is cyclically operated, at intervals of one-half microsecond in synchronism with timing signals CC supplied by timing controls 4. Permanent store 3 contains 2,816 microinstructions each including 90 microoperation control bits. The store thus cyclically produces 90 bit microinstruction control signals at 5 which are used to control the gates of the system.

In the particular embodiment herein, store 3 is a capacitor Read Only Store of a known type including a matrix of cross pairs of row input select wires and column output control wires. At the crosspoints of this matrix the pairs of row wires are permanently coupled to the pairs of crossing column wires by pairs of capacitances which are binary complements of each other so that different binary patterns of column output control signals are produced by energizing different row select wires. A typical store this type is disclosed for example in the IBM Technical Disclosure Bulletin, vol. 5, No. 8, pp. 47–48, by C. E. Owen et al., in the article entitled, "Read Only Memory."

Each control signal field of 90 bits produced by store 3 includes a segment which under ordinary conditions of intrinsic control is usually used as part of the address of the next microinstruction field to be selected, and thereby limits the selection of the successor microinstruction to a sub-set of the full set of 2,816 microinstructions. However, under extrinsic program control conditions to be described, the intrinsic address selection information is ignored, and selections are made instead on a randomly variable basis, from the complete set of 2,816 microinstructions, in accordance with and in a sequence specified by extrinsic information supplied through the erasable store 1. Microinstructions provided exclusively for handling this extrinsic information are distinguished by the symbol SMI, all other microinstructions being denoted by a different symbol OMI. Thus, the 90 bit output field 5 of the store 3 is shown with an SMI signal path 6 extending to the right and an OMI branch 7 extending to the left.

In the ordinary intrinsic control mode of operation, microinstructions are selected from the store 3 in accordance with 12-bit address signals supplied by the intrinsically controlled address sequence selecting unit 8, through a group of twelve OR circuits 9. In each basic timing cycle the address output of the unit 8 is determined at least in part by intrinsic control information which is obtained either from the current output of the control store 3 or from a source of predetermined interruption address signals within the unit 8. When a special DIAGNOSE program instruction is interpretively sensed by the intrinsic microprogram controls (3, 8) in the manner described below, the next address signal supplied to the permanent store 3 is furnished through the 12-line connection 10 by an extrinsically controlled variable sequence selecting unit 11. Thus the signals supplied by unit 11 are each capable of selecting any one of the 2,816 microinstruction addresses regardless of the present microinstruction output. The extrinsic information handled by the unit 11 comprises 16 bits supplied through one of two bus connections, 12 or 13, according to a predetermined procedure described below. Of the sixteen bits obtained in this manner twelve are transferred directly to the bus 10 as an address signal and four are retained by the unit 11 for other control purposes to be described.

Each address signal provided by selecting unit 8 to the store 3, via connecting lines 14, is determined by one of three branching procedures, known as conditional branching, function branching, and interruption branching. In a conditional branch the unit 8 selects ten predetermined bits from the current output field of the store 3, via bus connections 7 and 15, and two branch control bits, from two of several sources, via bus 16. The selected bits are combined to form a 12-bit microinstruction address which is applied via bus 14 and OR-circuits 9 to the address selecting controls of the store 3, thereby determining the next microinstruction signal to be produced at output 5 of said store.

Function branches occur only at predetermined phases of the intrinsic microprograms which interpret program instructions. These microprograms, which are collectively denoted as I–FETCH sequences, or I–FETCH microprograms, comprise series of microinstructions which are selected in sequence through conditional and function branches. These microinstructions are effective to control the retrieval and interpretive execution of a program instruction held in the program store 1, by controlling all of the signal transfer operations required in connection with such retrieval and execution; for example, all of the operations required to retrieve and multiply two erasably stored factor quantities. A complete I–FETCH sequence comprises a variable number of conditional branches and two function branches. The first of the two function branches is performed after the selected program instruction has been transferred into a register reserved therefor in computing circuits 2. This is followed by a number of conditional branches and then the second function branch. Each program instruction includes an 8-bit operation or order code (abbreviated OP CODE) which defines the function to be performed in response to the instruction. The first function branch is based on a first four of these 8-bits, combined with eight intrinsic bits of predetermined value to specify an address, and initiates a first microprogram segment to recover the program data to be processed in connection with the execution of the instruction. The second function branch occurs at the end of this segment and initiates a second microprogram segment to perform the required program operation. The second function branch is conditioned on the last four bits of the OP CODE and eight other intrinsically determined bits.

In an interruption branch the unit 8 produces one of several intrinsically predetermined addresses specifying the initial microinstruction of a conditional branch microprogram series for storing current status information, for handling the interruption, and for thereafter restoring the conditions preceding the interruption.

Since each program instruction OP CODE is interpreted by two function branches, there are at most 256 (16×16) microinstructions which can be addressed by a function branch. Thus, the extrinsic system programmer would ordinarily have a limited complement of at most 256 basic order codes or commands at his disposal, which are interpreted only by function branches at predetermined phases of I–FETCH sequences, and the remaining 2,560 or more microinstructions in the store 3 would ordinarily not be at all accessible for direct extrinsic control.

The addresses produced by the unit 11 are not subject to these restrictions because of the control effects initiated by DIAGNOSE instructions. As shown in FIG. 3, a DIAGNOSE instruction includes an OP CODE segment which is the binary coded decimal representation for the number 83, and variable information segments identified by the letters I, B, and D. The segment I is used during the I–FETCH segment resulting from the first function branch in the intrinsic DIAGNOSE I–FETCH microprogram to establish data transfer conditions which subsequently enable the system to carry programmed test signals to all of its internal bistable elements upon occurrence of certain test control signals, and the segments B and D are acted upon in combination during the second I–FETCH segment to produce a 16-bit extrinsically variable data quantity. Four of these 16-bits are used to variably condition circuits within the unit 11 which can exercise supervisory interruption control over the unit 8 in a manner to be described, and the other 12 bits are carried as an address signal to the address selection controls of the store 3, and thereby serve to select an arbitrary one of the 2,816 microinstructions stored therein.

Following the handling of this quantity the circuit 8 resumes control of the address sequencing on either a conditional or unconditional basis depending upon the state of one of the four condition bits applied to the unit 11. If the control of unit 8 is unconditional, the microprogram selections proceed via ordinary intrinsically determined conditional branches and control does not thereafter revert to the unit 11. However, if unit 8 has conditional control, it operates for a variable number of microcycles specified by the other three of the condition bits applied to the unit 11, and then control automatically reverts to the unit 11, regardless of the current microinstruction state of the system. Since unit 8 would oridinarily operate to deliver an address signal at this point in the address sequencing it is necessary to provide inhibit signals from the unit 11 via a connecting line 20 to transfer gates (not shown) within the unit 8 through which microinstruction address signals are ordinarily conveyed to the store 3.

When control reverts to the unit 11 in this manner, the unit initiates a special microprogram sequence, including a number of microinstructions of the SMI type noted above, which is effective to retrieve another 16-bit word of extrinsic program data from an address location within the store 1 consecutive in program sequence to that at which the DIAGNOSE instruction was stored. This data is handled by the unit 11 in the same way that the information derived from the DIAGNOSE instruction segments B and D was handled, whereby control is again passed to the unit 8 on a conditional or unconditional basis. In this manner extrinsically determined 16-bit units of program data in store 1 can be chained together to produce a corresponding sequence of variably selected microinstructions, separated by variably truncated segments of ordinary intrinsic microprograms. Since the lengths of the truncated segments are determined by three of the sixteen extrinsic program data bits, a truncated segment produced in this manner, in the present exemplary embodiment, can have no more than seven microinstructions.

Another way in which control can be passed to unit 8 on a temporary, but more extended, basis is via the KERNEL microprogram technique. KERNELS are sets of microinstructions which can be produced and linked together by ordinary conditional branches of the unit 8 but which can be initiated only by an operation of the unit 11. Thus, a DIAGNOSE instruction can be used as a key to initiate access to a first microinstruction of a KERNEL microprogram, after which unconditional control passes to the unit 8 and other microinstructions of the KERNEL are produced in an intrinsic conditional branching sequence.

A KERNEL sequence is terminated either by a conditional branch to an ordinary microinstruction (OMI) not in the KERNEL set (KMI) or by selection of a special microinstruction (SMI), within the KERNEL set, which reverts control to unit 11. When control reverts to unit 11 in this manner it is not necessary to energize inhibit line 20 since the SMI microinstruction field will contain bits which directly control the unit 8, whereas when control reverts due to conditions established within the unit 11 the reversion is independent of the current microinstruction state and therefore the normal production of an address by the circuit 8 must be suppressed.

DETAILS OF DIAGNOSE INSTRUCTION HANDLING

Details of the handling of a DIAGNOSE program instruction and the extrinsic program data supplied therewith are explained with reference to FIGS. 2 and 4. FIG. 2 illustrates material circuit details, in schematic form, of the program store 1, the computing circuits and registers 2, the variable microinstruction sequence selecting unit 11, and certain of the pertinent connecting elements, including the busses 12 and 13 and the gates 17.

As indicated within broken outline 1 in FIG. 2, the variable program store 1 includes an erasable storage matrix 30, and a buffer register 31 through which extrinsic program information passes bidirectionally into and out of the storage matrix. Information is handled by the matrix in 36-bit word units; hence the notation 36 is shown in the data bus lines 32 and 33 extending unidirectionally to the gates 17. A buffer storage address register 34 (also designated SAR) designates the word location within matrix 30 which is currently scheduled to receive or dispense information. Matrix 30 receives and dispenses information in two part read-write cycles of predetermined duration. In each such cycle the address information supplied to register 34 is furnished through either an instruction address connection 35 or a data address connection 36, and OR circuits 37. Connection 35 is conditionally coupled via gates 38 to an instruction address counter-register 39 (also designated IAR). Connection 36 is conditionally coupled via gates and connections (not shown) to the computing circuits 2.

The gates 38 are enabled by outputs on line 40 of an OR circuit 41 which is controlled by certain of the OMI and SMI micro-operation control signals. IAR is also provided with a counting connection 42 to the OR circuit 41 by means of which the program instruction address can be indexed in unit increments as the instructions are used.

During intrinsic I–FETCH microprograms, microinstruction signals OMI pass through OR circuit 41, actuating the gates 38 to pass instruction address signals into storage address register 34, thereby operating matrix 30 to dispense program instructions to buffer 31, after which the instruction address in IAR is incremented. Other OMI signals energize the gates 17 to pass the instruction information from the register 31 through the gate 17 into an instruction buffer register 43 within the computing circuits 2. Each word unit of 36-bits handles through register 31 generally includes 32 information bits and 4 parity bits which are checked against each other by means not shown since they are not pertinent to the present invention. Although also not pertinent to the present invention, to complete the environmentatl description it is noted that a program instruction in this particular embodiment can be either a half word, a full word, or one and one-half words in length (i.e. 16, 32, or 48 bits) and may therefore be handled by the microprogram controls in more than one pass at the program storage matrix 30. Program data address information contained in register 43 is then processed by the circuits 2 to produce one or more address signals on connection 36, whereby the handling of the instruction relative to the store 30 may be completed.

Directing attention now to the treatment given to the DIAGNOSE instruction by the circuits of FIG. 2, during the second function branch segment of the intrinsic DIAGNOSE I–FETCH microprogram, while the instruction is contained in register 43, the instruction quantities B and D (FIG. 3) are respectively applied from register 43 to a selection matrix 45, and to a set of gates 46, via connections 47 and 48 respectively. Simultaneously, gates 46 and 49, the latter connected to the output of selection matrix 45, are energized by the passage of a special micro-operation control signal designated $SMI_{00}$ through OR circuit 50. The signal B applied to matrix 45 selects the output (B) of one of several B-registers 51 and transfers the same to the gates 49. The outputs of gates 49 and 46 are added together in computer adding circuit 52 to produce a 36-bit sum quantity $(B)+D$, of which 16 bits are applied to sixteen respective gates 53 within the program variable selecting unit 11. Since the sum quantity $(B)+D$ may also be produced for other program instructions, the OR circuit 50 is shown as having another micro-operation control input OMI. Gates 53 are actuated by special control signal $SMI_{00}$ to pass the $(B)+D$ sum signal in parallel through 16 OR circuits 54 to connection 55 from which it branches into a four-bit connection 56 and a 12-bit connection 57.

The 12 bits in connection 57 are passed through OR circuits 58 to an address selecting register (not shown) in the microinstruction store 3 of FIG. 1, to thereby variably determine the next address selection therein. Simultaneously, one of the 4 bits on cable 56 is applied to a bistable condition register, or flip-flop circuit, 59 (designated SST, for Supervisory State Trigger) and the other 3 bits are applied in parallel to respective stages of a 3-stage counting circuit 60 (denoted CAC, for Clock Advance Counter). If bistable circuit SST is not switched to an active condition from its usual idle state by the bit signal applied thereto, the circuit 11 reverts to, and remains in, an idle condition after passage of the address signal through connection 57. But if SST is reversed in state, the circuit 11 remains temporarily idle for a variably predetermined number of elemental cycles determined by the 3-bit extrinsic code applied to the counter CAC, and then it becomes active. An AND circuit 61 is connected to CC, SST and the outputs of counter CAC whereby it produces a cyclic timed output only when CAC is in a predetermined digital state—specifically the state representing a stored digital value 0—while simultaneously SST is in an active or 1 condition. Another AND circuit 62 is coupled to CC, SST, and to the complement of the output of AND circuit 61 via inverting circuit 63, whereby it produces a timed output only when CAC does not contain a 0 value while SST is in the 1 state. When AND circuit 62 produces an output the count value stored in CAC is decreased by one. If, however, AND circuit 61 produces an active output at its output junction 64, lines 20, 65 and 66 are energized.

As previously indicated an active signal on line 20 inhibits the address transfer operation of unit 8 (FIG. 1) for the current cycle. The signal on line 20 passes through OR circuit 67 as a special control signal, hereinafter designated $C_0$, which conditions a set of twelve gates 68 to pass a predetermined address signal described below, and the signal on line 66 resets SST to its idle (0) condition. The gates 68 are connected to a constant signal source which represents the address of a special microinstruction designated $SMI_{10}$. Thus, upon energization of gates 68 this address is carried through the OR circuits 58 to the address controls of store 3 (FIG. 1), in place of the address which would normally have been furnished by the unit 8.

$SMI_{10}$ includes a micro-operation control signal which passes through the OR circuit 41 to the energizing inputs of gates 38 and to the indexing input of the program instruction address register 39. At this point the address in register 39 is one greater than the DIAGNOSE instruction address. Thus, the information transferred from register 39 by the first signal $SMI_{10}$ specifies the address consecutively following the DIAGNOSE instruction address. Another micro-operation control signal $SMI_{11}$ is applied to the matrix 30 to transfer information between the location therein selected by the register 34 and the input-output buffer 31. Since a read-write cycle of the storage system 1 may extend over a plurality of cycles of the microinstruction store 3 of FIG. 1, the micro-operation control signal $SMI_{11}$ may similarly be required to be extended over a plurality of cycles relative to $SMI_{10}$, and is therefore shown as a signal distinct from the signal $SMI_{10}$. Signals $SMI_{11}$ are also applied to read and write excitation lines of the matrix 30 via the OR circuit 70, the latter also receiving OMI control signals for ordinary read/write excitation of the matrix, and to gates 72 in unit 11 which transfer information from the buffer 31 to SST, CAC and OR circuits 58 via OR circuits 54. Thus, variable program information taken from an address in store 30 next to a DIAGNOSE program instruction address, determines the next microinstruction address selection in store 3 and the subsequent conditional operation of the gates controlled by SST and CAC.

The signal $C_0$ produced by an output from AND circuit 61 may also be produced by a special micro-operation control signal $KMI_{00}$ which is derived from a special OMI microinstruction contained in a special kernel sub-set of the OMI microinstructions. Kernel sub-sets which can terminate by a branch to the microinstruction from which $KMI_{00}$ is derived cannot be addressed through intrinsic operation of the unit 8 unless a first microinstruction in the set is first selected by an extrinsically determined operation of the unit 11. Such sub-sets are thereby protected against inadvertent or accidental access.

A signal $KMI_{00}$ produces the same effect as an output from AND circuit 61, except that it does not directly reset SST to the idle condition, this being unnecessary since SST is already in that condition during kernel processing, and also it need not inhibit unit 8 via the line 20, such inhibition not being required since the KMI microinstruction from which $KMI_{00}$ is derived is in direct control of the operation of unit 8. Not all of the kernel sequences terminate with the $KMI_{00}$ control effect. Some terminate naturally by conditional branches to other OMI microinstructions for example, the initial microinstruction of an I-FETCH sequence.

Figure 4:
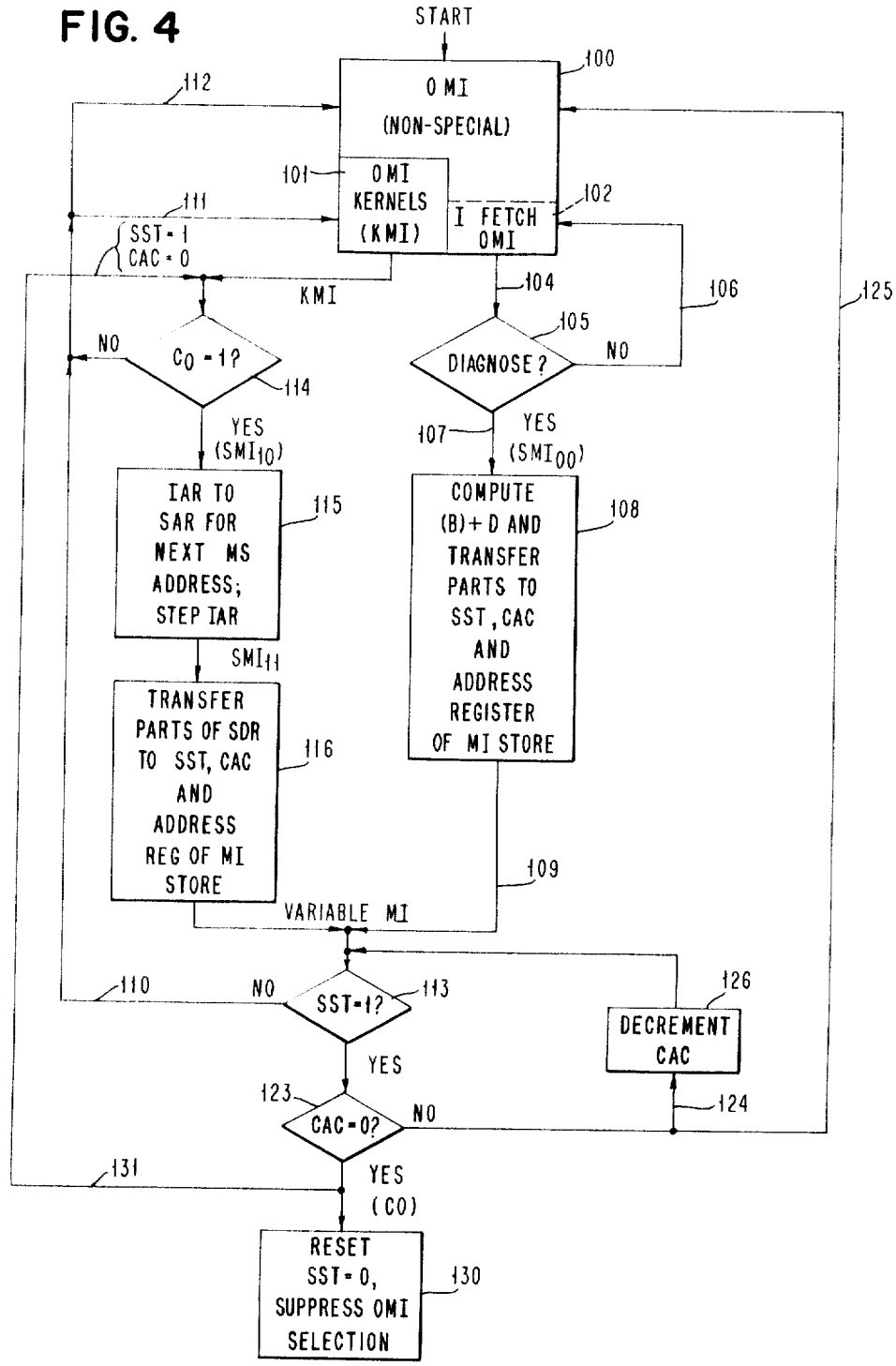
FIG. 4 is a diagrammatic operation flow chart which is used to explain the functions and sequence of selection of microinstructions produced by the permanent microinstruction store shown in FIG. 1 during ordinary intrinsically controlled sequencing and during extrinsically controlled DIAGNOSE sequencing.

Reviewing the foregoing description of operation with reference to the diagrammatic flow chart presented in FIG. 4, it is seen that the OMI microinstructions comprise a set 100, including kernel sub-sets 101 and I-FETCH sub-sets 102. In ordinary intrinsic address sequencing the intrinsic controls sequence only through the addresses of OMI microinstructions at 100, repeatedly executing I-FETCH microprograms 102 to reference extrinsic program instructions erasably stored in program storage matrix 30. These instructions are executed in sequence except when program branches are produced by entry of branch address information into the IAR register 39 of FIG. 2. During each I-FETCH microprogram sequence, as indicated by the line 104 emerging from section 102 of the microprogram block 100, a conditional branch 105 is taken by the addressing unit 8 (FIG. 1), according to whether or not the fetched instruction is a DIAGNOSE instruction (i.e. according to whether or not the OP CODE is 83).

If the instruction is not a DIAGNOSE instruction, as implied by the line 106 extending back into the I-FETCH sub-set 102 of block 100, the microprogram continues in the normal sequence to execute the fetched instruction. But if the instruction is a DIAGNOSE instruction a conditional branch 107 made by unit 8 routes the microprogram to a sequence (108) beginning with a microinstruction including the signal $SMI_{00}$. In this sequence, the quantity $(B)+D$ is computed and parts thereof are applied to SST, CAC and the address register of the microinstruction store 3.

At this point in the microinstruction sequencing the microinstruction store will produce an output corresponding to a variable one of its 2,816 microinstructions, as indicated at 109, and the circuits 11 will be set to conditionally control the subsequent microinstruction sequencing in accordance with the extrinsic information applied to SST and CAC. As indicated by line 110 and its branches 111 and 112 extending from the negative outlet of decision point 113, if the state of SST has not been changed at 108 the next microinstruction will be selected in sequence, by a conditional branch of the unit 8 of FIG. 1, either to a kernel sub-set 101 of the OMI microinstructions 100, or to others of the OMI microinstructions. If the latter branch is taken, in effect the DIAGNOSE instruction sequence has terminated and normal microprogram sequencing has been resumed. On the other hand, if a kernel sequence is initiated, it will terminate by intrinsically controlled branches either to a microinstruction giving rise to a micro-operation control signal $KMI_{00}$, which acts through OR circuit 67 of FIG. 2 to produce a signal $C_0$, or to an ordinary OMI selection. Micro-operation outputs are tested for $KMI_{00}$ ($C_0=1$) at 114. A negative response here routes the control sequence back to the sub-set 101 or general set 100, via line 111 or 112, respectively. A positive response, however, leads to $SMI_{10}$ and $SMI_{11}$ (sequence 115, 116) by means of which the information at the address specified by IAR is transferred to SST, CAC, and the address selection controls of store 3, and the program address in IAR is increased by a unit increment. This returns the control sequence to the SST decision point 113.

If at 113, $SST=1$, then the subsequent course of the microprogram is determined by the state of CAC, as indicated at branch point 123. As shown by the lines 124 and 125, branching from the "No" output of branch point 123, if the value stored in CAC is not 0, it will be decremented by a unit amount, as stated at 126, and the next microinstruction will be selected in the intrinsic sequence from the OMI set 100.

If, however, at 123 the value in CAC is zero, SST is reset to zero and the next OMI microinstruction selection of unit 8 is inhibited (130). Also (131) the value of $C_0$ is again tested at 114, with affirmative results, to produce the sequence 115, 116 ($SMI_{10}$, $SMI_{11}$).

Thus, it may readily be seen from FIG. 4 that normal intrinsic microprogram sequencing can be variably interrupted by a DIAGNOSE program instruction and thereafter restored in one of two ways; specifically, by a "No" output at 113, or a "No" output at 114, followed by an OMI selection via path 112 (FIG. 4). Further, it may be noted that a transfer of extrinsic information into and through the unit 11 of FIG. 2 can occur in one of three ways; i.e. via the initial DIAGNOSE handling (108), via SST=1 and CAC=0 (113, 123, 131, 114, 115, 116) or via KMI₀₀ (111, 114, 115, 116). Since the transfer controlled by SST=1 and CAC=0 is independent of the current microinstruction state, unit 8 must be inhibited (130) and SST must be reset (130). This last operation would not be necessary if the signals at 56 in FIG. 2 were capable of actively setting the circuit SST to either of its two states since a "yes" response at 123 in FIG. 4 is always followed by another transfer (116) of extrinsic information signals to SST and CAC.

EXAMPLE OF APPLICATION OF DIAGNOSE INSTRUCTION

As indicated by the example shown in FIG. 5 the DIAGNOSE instruction may be combined with other extrinsic program instructions to produce highly useful and variable microinstruction sequencing effects. In this regard it is noted that the full complement of extrinsic program instructions which are executable by a family of data processing systems, of which the system shown in FIG. 1 is a member, and the operations which are performed thereby, are discussed at length in copending patent application Ser. No. 357,372 by G. M. Amdahl et al., filed April 6, 1964. The three program instructions shown in the example of FIG. 5 are the LOAD instruction, which has the format indicated at 151, the DIAGNOSE instruction indicated at 152, and the BRANCH ON COUNT instruction indicated at 153. When these instructions are performed in sequence, as described herein it will be shown that the sequence conditionally closes in a loop in which the sequence of three program instructions is executed repeatedly with incremental changes in the data specified therein, whereby in each pass through the program loop a different one of the 2,816 microinstructions is selected from the microinstruction store 3 of FIG. 1 at a predetermined point in each loop. Hence, if the output of the store 3 is sampled at this predetermined point in each loop, and displayed on an oscilloscope, as shown in FIG. 6, the outputs due to all of the different microinstruction words of the store 3 can be superimposed over one another in a composite display as shown at 154 in FIG. 6, whereby, for example, delicate timing adjustments may be made in the phase of occurrence of cyclic gating signals applied to the output of the store 3, to improve the signal to noise ratio of the output.

The program in FIG. 5 starts with the initial execution of the LOAD program instruction. This is partitioned into two OMI microprogram segments; a LOAD I–FETCH segment 155 and a LOAD EXECUTE segment 156. During segment 155 the LOAD instruction 151 is retrieved from its location in program storage and placed in the instruction buffer register 43 of FIG. 2. The LOAD instruction contains five information sections 158–162. Section 158 represents the OP CODE (BCD 58), section 159 specifies a B register within the computing circuits 2 of FIG. 2, and section 160 specifies another computing circuit register Y not shown in FIG. 2. Section 160 indicates a register B which, for this particular LOAD instruction, happens to be the same as the register B specified in section 159. Section 162 contains a displacement quantity D which is a constant.

In executing the LOAD instruction the corresponding microprogram enables gates which form the sum of D with the quantities (Y) and (B) found in the respective registers Y and B. The sum $(Y)+(B)+D$ is used to address a corresponding program storage location in matrix 30 from which extrinsic information is transferred to the register B specified at 159. Thus, if the value (Y) in register Y is 1, and that in register B is initially 0, the new contents of (B) will be the contents of program storage location $D+1$. If the contents of consecutive locations $D+i(i=1$ to $2,816)$ differ from each other by unit amounts, and the LOAD instruction is repeatedly executed, the address sequence $(B)+D+1$ will correspond to the number sequence $D+i$. When the first LOAD microprogram is completed at 163, the register B contains the contents $(D+1)$ of the first of a series of extrinsic program storage address locations $D+i$ arranged so that both the contents and the addresses are ordered in an arithmetic progression, for reasons which will become clear from the following discussion.

At 164 an I–FETCH microprogram is initiated, this time to fetch the DIAGNOSE program instruction indicated at 152. In this instruction the register B is the same as that specified in the LOAD instruction 151, and the displacement quantity D is zero. The DIAGNOSE instruction is found at the next consecutive program storage instruction address following the LOAD instruction. It will be recalled that for the DIAGNOSE program instruction the contents (B) of the register B are added to the quantity D and the sum is applied directly to the bistable circuit SST, the counting circuit CAC, and the address register of the microinstruction store 3 (see FIG. 2), via the gates 53 and OR circuits 54 and 58 (FIG. 2). Since D equals zero in the particular DIAGNOSE instruction shown at 152, it is clear that the B register contents (B) (i.e. the contents of $D+1$ specified in instruction 152) will be transferred unchanged to SST, CAC and the microinstruction address register, as indicated at 165 in FIG. 5. In this transfer the twelve lowest order bits of (B) are used as the microinstruction address, the next three bits are applied to CAC, and the sixteenth bit is applied to SST. These bits are so arranged that SST is set to 1, CAC is set to the unit count 001, and the microinstruction address is that specified by 000000000001.

Since the contents of counter CAC are 001 at 166 the microinstruction store is cycled in the intrinsic OMI sequence, to its next sequential state, while the counter is decremented by a unit amount as indicated at 167. At this point the combination of conditions, SST equal 1 and CAC equals zero, raises $C_0$ and signal lines 20 and 66 (FIG. 2). The predetermined address of SMI₁₀ passed by gates 68 (FIG. 2) initiates the retrieval of an extrinsic program data word from the instruction address following that at which the DIAGNOSE program instruction 152 is stored, and the transfer of the information in that word to SST, CAC and the microinstruction address register as indicated at 168. In this transfer SST is set to 0, CAC is set to 000, and the microinstruction address register is set to the address of the first instruction of an I–FETCH microprogram.

Hence, as indicated at 169, the microprogram controls proceed through another I–FETCH routine to fetch and execute the BRANCH ON COUNT program instruction having the format shown at 153. This latter instruction contains an OP CODE which is the binary coded decimal representation of the number 6 and two other information sections, 170 and 171. Section 170 specifies an X register, and section 171 is the representation L of the address location in program storage of the LOAD program instruction 151. As indicated at 172, after recovery of the instruction 153, the microprogram controls compare the quantity in the X register specified at 170 with the number zero. If the contents of the X register are equal to zero $((X)=0)$ the program instruction consecutively following the instruction 153 in program storage will be executed, whereas if the contents of the X register are not zero a conditional branch microprogram is performed at 173 to set the LOAD instruction address 171 into the program store instruction address register 39 (FIG. 2) whereby the next I–FETCH microprogram will retrieve the LOAD instruction 151 and thereby initiate repetition of program 151–153. Upon each "$i$th" repetition of this program the contents of location $D+i$ are entered in B. If these contents vary in unit increments the lowest order bits in register B, and therefore the microinstruction storage address specified at procedural phase 166 by the DIAGNOSE instruction, will vary in unit increments. If the intial contents of the X register specified at 170 correspond to the quantity 2,816 (the capacity of the microinstruction store) the program 151–153 will be terminated after 2,816 repetitions.

Since the contents of the B register at phase 166 vary with each repetition, each of the 2,816 microinstructions will be addressed once at phase 166, and therefore, as indicated in FIG. 6, the 2,816 different output signals in one column position of the microinstruction storage matrix, each representing either an active "1" or "0" output control bit, may be superimposed upon one another on a suitably triggered oscilloscope display. As indicated at 174 in FIG. 6 the sampling condition which may be utilized to control the oscilloscope is $SST=1$ and the value of CAC not equal to 0, since this condition is present only after the extrinsic information transfer operation indicated at 165, at which time the microinstruction address corresponds to the variable index quantity J ranging between 1 and 2,816. Thus, the simple program illustrated in FIG. 5 can produce an oscilloscope display by means of which a technician can examine and adjust the timing of the individual outputs, for example, to bring them closer together in time phase, or he can adjust the common timing of all outputs, by positioning an output gating signal in time, thereby improving the output signal to noise ratio characteristic.

Having thus described the structure and an exemplary application of the subject extrinsically adaptable microprogram controls, it is observed that those skilled in the art will readily devise other applications analogous or similar to the one shown in FIG. 5.

What should be noted in regard to all such applications is that the DIAGNOSE instruction and the associated sequence control circuits of FIG. 2 enable a system programmer to establish standardized programs for automatically exercising a data processing system of the type herein described through unrelated micro operations which ordinarily would constitute "bits and pieces" of longer intrinsically established microprogram sequences. This enables the programmer to establish programs for comparing signals actually produced in elemental cycles of system operation to signals predicted for a theoretical model of the system, on a simple and systematic basis, despite the intrinsic complexity of systems of this type. Thus, system evaluation and maintenance procedures can be reduced to simple programming exercises which can be accumulated with experience into sophisticated program routines, whereby the latter can be used to eliminate much of the time consuming selective manual tests hitherto performed by engineering and maintenance personnel.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Data processor sequence controls comprising:
   means ordinarily operable in response to extrinsically variable program instruction signals to produce corresponding series of intrinsically scheduled micro-operations, each series beginning with a micro-operation which is a member of one predetermined proper sub-set of the set of all micro-operations intrinsic to said means;
   means operated by said first-named means in response to a predetermined program instruction to produce a variable sequence control signal which can be varied extrinsically and can designate a plurality of different members of said set including members other than those in said proper subset; and
   means responsive to said predetermined program instruction to control said first-named means directly in accordance with said variable sequence control signal to initiate a variable series of micro-operations not subject to the limitations imposed on said means in ordinary operation thereof.

2. Data processor sequence controls comprising:
   means ordinarily operable in response to extrinsically variable program instruction signals to selectively produce a corresponding series of micro-operations according to an intrinsically predetermined schedule, each series beginning with a micro-operation which is a member of one predetermined proper sub-set of the set of all micro-operations intrinsic to said means;
   means operated by said first-named means in response to a particular one of said program instruction signals to produce a variable sequence control signal capable of designating any member of said set of micro-operations, said last-named means having extrinsic access controls therein affording extrinsic access thereto for varying any part of said sequence control signal in accordance with program information; and
   means responsive to said particular program instruction to control said first-named means directly in accordance with said variable sequence control signal to initiate a series of micro-operations beginning with an arbitrary member of said set of all micro-operations.

3. An improved organization of data processor sequence controls comprising:
   means ordinarily operable in response to extrinsically variable program instruction signals to selectively execute corresponding series of micro-operations, each according to an intrinsically predetermined schedule and each beginning with a micro-operation which is a member of one predetermined proper sub-set of the set of all micro-operations intrinsic to said means;
   means operable to produce a variable sequence control signal including a micro-operation designating section capable of designating any member of said set of all micro-operations and a selective control extension section useful to selectively extend the operation of the last-named means to the sequential production of other sequence control signals, said last-named means having the facility to erasably store a plurality of sequence control information units for producing a corresponding plurality of said sequence control signals;
   means operable to control the selection of a micro-operation by said first-named means in accordance with said micro-operation designating section of said sequence control signal to initiate a series of intrinsically scheduled micro-operations beginning with an arbitrary member of said set of all micro-operations;
   means responsive to a particular program instruction in cooperation with said first-named means to operate said second-named and third named means; and
   means responsive to said selective control extension section of said sequence control signal produced by said second-named means to selectively extend said arbitrarly begun series of micro-operations by selectively conditioning said second-named means to produce another sequence control signal after a predetermined number of micro-operations in said series have been performed, said predetermined number specified by said control extension section of said sequence control signal.

4. Data processor sequence controls comprising:
   a source of extrinsically variable program instruction and program information signals;
   means ordinarily operable to process said instruction and information signals in intrinsically determined sequences of micro-operations initiated variably in accordance with said instructions;
   means operated by said instruction processing means during the processing of one particular instruction to produce a variable sequence control signal specified by program information accompanying said particular instruction;

and means operable to apply said sequence control signal to directly control said first-named instruction processing means for at least one micro-operation cycle thereof to initiate an intrinsic sequence of micro-operations commencing with a variable micro-operation specified by said sequence control signal.

5. Sequence controls according to claim 4 wherein:
said particular instruction and accompanying program information are employed to initiate variable sequences of micro-operations which yield diagonstic information concerning the performance of said sequence controls and of the processor system controlled thereby.

6. Data processor sequence controls comprising:
a source of extrinsically variable program instruction and program information signals;
means ordinarily operable to process said instruction and information signals in intrinsically determined sequences of micro-operations initiated variably in accordance with said instructions;
means operated by said instruction processing means during the processing of one particular instruction to produce a variable sequence control signal specified by program information accompanying said particular instruction;
and means operable to apply said sequence control signal to directly control said first-named instruction processing means for at least one micro-operation cycle thereof to initiate an intrinsic sequence of micro-operations commencing with a variable micro-operation specified by said sequence control signal and terminating after a predetermined number of cycles of micro-operation also specified by said sequence control signal.

7. Sequence controls according to claim 6 wherein:
said source includes an erasable information store.

8. Data processor sequence controls comprising:
a source of extrinsically variable program instruction and program information signals;
means ordinarily operable to process said instruction and information signals in intrinsically determined sequences of mirco-operations initiated variably in accordance with said instructions;
means operated by said instruction processing means during the processing of one particular instruction to produce a variable sequence control signal specified by program information accompanying said particular instruction;
means operable to apply said scquence control signal to directly control said first-named instruction processing means for at least one micro-operation cycle thereof to initiate an intrinsic sequence of micro-operations commencing with a variable micro-operation specified by said sequence control signal; and
means operable selectively only during intrinsic sequences begun by said third-named means to condition said second-named and third-named means to respectively produce other variable sequence control signals and initiate other corresponding intrinsic sequences of micro-operations, whereby the variable sequence initiated during the processing of said particular program instruction may be variably extended by a series of extrinsically determined micro-operation branches.

9. Data processor sequence controls comprising:
a source of extrinsically variable program instruction and program information signals;
means ordinarily operable to process said instruction and information signals in intrinsically determined sequences of micro-operations initiated variably in accordance with said instructions;
means operated by said instruction processing means during the processing of one particular instruction to produce a variable sequence control signal specified by program information accompanying said particular instruction;
and means operable to apply said sequence control signal to directly control said first-named instruction processing means for at least one micro-operation cycle thereof to initiate an intrinsic sequence of micro-operations commencing with a variable micro-operation specified by said sequence control signals and terminating after a predetermined number of cycles of micro-operation also specified by said sequence control signal; and
means operable selectively only during intrinsic sequences begun by said third-named means to condition said second-named and third-named means to respectively produce other variable sequence control signals and initiate other corresponding intrinsic sequences of micro-operations, whereby the variable sequence initiated during the processing of said particular program instruction may be variably extended by a series of extrinsically determined micro-operation branches.

10. Data processor sequence controls comprising:
a source of extrinsically variable program instruction and information signals, said source including an erasable information store;
means ordinarily operable to process the instruction and information signals supplied by said source by executing distinctive intrinsically determined sequences of micro-operations, each micro-operation specified by an intrinsically stored micro-instruction, each sequence determined in part by order code information in the instruction being processed;
means operated by said instruction processing means, in connection with the processing of an instruction containing a particular order code for scheduling variable auto-diagnostic operations, to produce at least one sequence control signal in accordance with information signals recovered from said erasable store in association with said instruction, said sequence control signal being capable of specifying any intrinsic micro-instruction of said first-named means; and
means operable with said sequence control signal producing means to access a variable microinstruction in said instruction processing means in accordance with one part of said sequence control signal and to predetermine the number of subsequent intrinsically controlled micro-operations of said instruction processing means.

11. In a data processor sequence control system including a permanent microinstruction control store and means for cyclically supplying microinstruction address selection signals to said store in accordance with a combination of intrinsically and extrinsically produced signals each said extrinsically produced signal designating a member of a sub-set of the set of all microinstructions in said store, means subject to extrinsic program control for intermittently supplying address signals to said store destermittently supplying address signals to said store designating an arbitrary member of the full set of microinstructions therein, said last-mentioned means comprising:
means including at least one particular microinstruction in said permanent store, responsive to an extrinsically produced program instruction signal having a particular order code for scheduling variable micro-operation sequences to produce an extrinsically determined variable sequence control signal;
said sequence control signal including a first section capable of designating the address of an arbitrary member of said full set of microinstructions in said control store, and a second section capable of controlling production of other sequence control signals;
means opertaed by the last-mentioned means to apply said first section of said sequence control signal to said control store to produce an arbitrary microinstruction signal output, and to store the said second section of said signal;

means selectively operable in response to the stored second section information to modify said information in predetermined cyclic increments;

means responsive to either a special microinstruction control signal or to a particular arrangement of stored second section or modified second section information to produce another independently determined extrinsically variable sequence control signal including first and second sections as defined above, and to inhibit operation of said cyclic microinstruction address supplying means;

and means operated by said last-named means to activate said applying and storing means to apply said first section of said another sequence control signal to said control store and to store said second section of said another signal in place of the second section information previously stored therein.

12. Extrinsically controlled address signal supplying means as defined in claim 11 and characterized further in that said means to apply and store said sequence control signal sections includes:
a bistable condition register circuit;
a counting circuit; and
gating means for applying parts of said second section of each said sequence control signal to said condition register and counting circuits.

13. Adress signal supplying means as characterized in claim 12 wherein the said means responsive to a particular arrangement as defined in claim 11 includes:
first gating means coupled to said condition register and counting circuits for conditionally varying the amount stored in said counting circuit in predetermined cyclic increments when said condition register is set to an active condition by said second section of said sequence control signals and said amount stored in said counting circuit is other than a particular predetermined amount;
second gating means coupled to said condition register and counting circuits for inhibiting operation of said cyclic address supplying means and for resetting said condition register to an idle condition when said condition register is in said active condition and said stored amount is equal to said predetermined amount; and
third gating means coupled to an outlet of said control store and to the output of said second gating means for producing a control signal to control the last-named means of claim 11.

14. In a data processing system including:
a general purpose erasable store and instruction counter for sequentially handling program instructions and other information, computing circuits and registers for sequentially processing said information in accordance with said instructions, and a permanently constructed control store for cyclically supplying microinstruction control signals to control cyclic micro-operations of said computing circuits and registers relative to instructions and information supplied through said erasable store, a control microinstruction sequencing system comprising:
normally operable means for cyclically supplying address signals to said control store to control ordinary microinstruction selections thereof;
said normally operable means having means therein for receiving program instruction order code information and other information capable of designating any member of a sub-set of the full set of microinstruction addresses in said control store and for supplying corresponding address signals to said control store;
first means coupled to an outlet of said control store and responsive to a first special micro-operation control signal therefrom to produce a special sequence control signal based upon information supplied with a special program instruction, said signal including a microinstruction address section, a supervisory condition section and a special count section;
said first special micro-operation signal being included in a microinstruction addressed by said normally operable means in connection with the processing of the order code of said special program instruction;
said microinstruction address section containing a sufficient nnmber of extrinsically variable signal elements to reference any member of said full set of microinstruction addresses;
second means coupled to said control store and responsive to a second special mico-operation control signal to recover another special sequence control signal from a predetermined address in said erasable store specified by said instruction counter and to increment said instruction counter; said another special sequence control signal including an address section, a condition section and a count section corresponding to the sections of said first-mentioned sequence control signal;
means for producing a predetermined control signal ($C_0$);
third means responsive to said predetermined control signal to produce a predetermined sequence control signal having only a predetermined address section;
means coupled to said first, second, and third means for individually translating said address sections of said respective sequence control signals to said control store;
means operable coincidentally with each operation of said translating means for suppressing an operation of said normally operable address supplying means;
second translating means coupled to said first and second means for individually handling the said condition and count signal sections of the sequence control signals produced by said first and second means;
a single-stage condition register coupled to said second translating means for receiving and storing a condition corresponding to said condition section of each said special sequence control signal;
a counting circuit coupled to said second translating means for receiving and storing an initial count value corresponding to the count section of each said special sequence control signal;
means coupled to outputs of said condition register and counting circuit and to inputs of said suppressing means and said predetermined control signal producing means to produce said predetermined control signal when said register and counting circuit are coincidentally in respectively predetermined states and to simultaneously set said register to the inverse of said respective predetermined state and issue an inhibit signal via said suppressing means to actively suppress a normal operation of said normally operable means;
means coupled to outputs of said condition register and counting circuit and to a counting input of said counting circuit for cyclically varying the count stored in said counter in unit increments when said register is in said respective predetermined state and said counting circuit is in any state other than said respective predetermined state; and
means connecting an outlet of said control store to another input of said predetermined control signal producing means to produce said predetermined control signal in response to a third special micro-operation control signal.

15. In a program controlled data processing system including sequence control means having M distinct operational states ordinarily selectable in intrinsically determined microprogram sub-routines corresponding to program instructions, means for directly controlling the selections of arbitrary ones of said states comprising:

means responsive to a particular program instruction to produce a digital address signal representative of variable program data and having $n$ variable digits referenced to a base integer R such that $R^n$ is at least as great as M;

means responsive to said address signal for conditioning said sequence control means to select a corresponding one of said M operational states; and means operable subsequent to said last mentioned means for enabling said sequence control means to continue operating from said selected state in an intrinsic selection sub-routine.

No references cited.

ROBERT C. BAILEY, *Primary Examiner.*

R. ZACHE, *Assistant Examiner.*